Patented Dec. 20, 1949

2,491,533

UNITED STATES PATENT OFFICE 2,491,533

ETHERS OF 9,10-DIHYDROXYOCTADECANOL

Daniel Swern, Philadelphia, Pa., assignor to the United States of America as represented by the Secretary of Agriculture No Drawing. Application January 16, 1948,
Serial No. 2,795

13 Claims. (Cl. 260—615)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to ethers of long-chain polyhydroxy alcohols, more particularly to ethers of 9,10-dihydroxyoctadecanol, and has among its objects the provision of new compositions of matter and processes for their preparation. Other objects will be apparent from the description of the invention.

I have found that ethers of 9,10-dihydroxyoctadecanol corresponding to the general formula

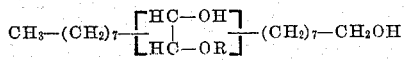

wherein R is an alkyl, alkenyl, haloalkenyl or aryl radical, are formed on reacting 9,10-epoxyoctadecanol with an organic hydroxy compound, as shown by the following equation:

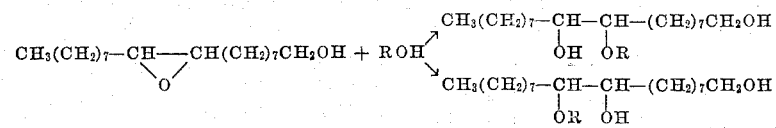

where R has the same significance as above.

According to the invention, 9,10-epoxyoctadecanol is reacted with the hydroxy compound by heating a mixture of the reactants, preferably in the presence of a catalyst. Upon completion of the reaction, the resulting ethers of 9,10-dihydroxyoctadecanol, which contains the ether group linked to the ninth or tenth carbon atom, are recovered from the reaction mixture by any suitable means, as for example, by distillation and/or solvent extraction.

Although the process is operative in the absence of any catalytic agent, the rate of reaction is greatly accelerated by the use of a catalyst. Suitable catalysts include, for example, sulfuric acid, benzenesulfonic acid, toluenesulfonic acids, naphthalene sulfonic acids and similar acidic catalysts. Alkaline catalysts may also be employed but they are less effective.

Hydroxy compounds, suitable for use in the production of the octadecanol ethers of the invention include saturated aliphatic alcohols, like methyl, ethyl, propyl, butyl, hexyl, octyl, lauryl and octadecyl alcohols, the alkyl radical of which may contain either a normal or a branched carbon atom chain; olefinic monounsaturated alcohols, such as allyl alcohol, chloroallyl alcohols, butenyl alcohols like methallyl alcohols, and other alkyl-substituted allyl alcohols; and aromatic hydroxy compounds, for example, phenol, cresols and the like.

The octadecanol ethers of my invention are relatively stable, high boiling, water-insoluble compounds which are useful as lubricants for delicate mechanisms, as pour-point depressants and viscosity index improvers for lubricant compositions, as plasticizers and modifiers for plastic compositions, as components of synthetic plastic materials and as chemical intermediates.

The following examples are illustrative of the invention:

Example I 28.5 g. of 9,10-epoxyoctadecanol were dissolved in 114 ml. of methanol with gentle heating. The solution was cooled below 30° C. and 0.3 g. of 95% sulfuric acid added with agitation. The mixture was heated on a steam bath for two hours and a quantity of sodium bicarbonate equivalent to the sulfuric acid was then added. The reaction mixture was fractionally distilled, first at atmospheric pressure to recover unreacted methanol, and then under vacuum to isolate the ether. The latter was dissolved in acetone, using 2–3 ml. of solvent per gram of solute, and the solution cooled to about —20° C. to precipitate the small amount of by-product of the reaction. The precipitate was removed by filtration and discarded, and the solvent was evaporated from the filtrate. The residual oil, 9,10(10,9)-methoxy-hydroxyoctadecanol, on redistillation, had the following characteristics:

Boiling range: 158°–161° C./0.007–0.008 mm.
$n_D^{30}$: 1.4584
$d_4^{30}$: 0.9151
Molecular refraction: 94.5

Example II 14.2 g. of 9,10-epoxyoctadecanol were dissolved in 142 g. of n-octadecanol at 60° C. and 0.14 g. of 95% sulfuric acid were added dropwise. The reaction mixture was heated on the steam bath for two hours and after cooling to room temperature was dissolved in ether. The ether solution was washed with water until free of sulfuric acid and evaporated to dryness. The residue was dissolved in acetone (10 ml. per gram) and the solution cooled to about —20° C. to precipitate unreacted octadecanol, which was separated by filtration. On evaporation of the acetone from the filtrate 18 g. of a residue consisting essentially of 9,10(10,9)-n-octadecoxyhydroxyoctadecanol were obtained.

Example III 49.6 g. of phenol were reacted with 15 g. of 9,10-epoxyoctadecanol in the presence of 0.15 g. of 95% sulfuric acid, following the procedure described in the foregoing example, except that the reaction mixture was heated on the steam bath for seven hours, and on evaporation of the ether solution the unreacted phenol was recovered by distillation under reduced pressure. The distillation residue was dissolved in 95% ethanol (5 ml. per gram) and after decolorization with active carbon, the solution was cooled to about —20° C. to precipitate a small amount of by-products which were removed by filtration. On evaporation of the solvent from the filtrate 13.4 g. of a residue of crude 9,10(10,9)-phenoxyhydroxyoctadecanol were obtained.

Example IV 9,10(10,9)-Beta-chloroalloxyhydroxyoctadecanol was prepared by reacting 9,10-epoxyoctadecanol with beta-chloroallyl alcohol by the procedure described in Example I. After neutralization of the catalyst with sodium bicarbonate, the unreacted beta-chloroallyl alcohol was distilled off under reduced pressure and the residue was dissolved in acetone (3 ml. per gram) and treated with activated carbon for one hour. The solution was filtered, cooled to about —20° C. and the small amount of precipitate which formed was filtered off and discarded. The acetone was distilled from the filtrate yielding crude 9,10(10,9)-beta-chloroalloxyhydroxyoctadecanol.

Example V

A number of ethers of 9,10-dihydroxyoctadecanol formed by interaction of the corresponding alcohol with 9,10-epoxyoctadecanol, were prepared by the procedure described in Example I. The characteristics of some of these compounds are listed in the following table:

| | Boiling Range | $n_D^{30}$ | $d_4^{30}$ | Molecular Refraction |
|---|---|---|---|---|
| 9,10(10,9)-ethoxyhydroxyoctadecanol | 179°-185° C./0.005-0.01 mm | 1.4565 | 0.9078 | 99.7 |
| 9,10(10,9)-n-propoxyhydroxyocatdecanol | 156°-168° C./0.005-0.01 mm | 1.4559 | 0.9040 | 103.6 |
| 9,10(10,9)-n-butoxyhydroxyoctadecanol | 170°-175° C./0.007 mm | 1.4562 | 0.9002 | 108.3 |
| 9,10(10,9)-iso-butoxyhydroxyoctadecanol | 163°-170° C./0.007-0.02 mm | 1.4550 | 0.8980 | 108.3 |
| 9,10(10,9)-alloxyhydroxyoctadecanol | 171°-188° C./0.02-0.03 mm | 1.4627 | 0.9166 | 102.9 |

Similar results were obtained using other catalysts, such as benzenesulfonic acid, toluenesulfonic acid, naphthalene-2-sulfonic acid and hydrogen chloride in place of sulfuric acid and heating the mixture at reaction temperature for a length of time sufficient to bring the reaction to completion.

Analogous products were also obtained by essentially the same procedures on reacting 9,10-epoxyoctadecanol with other alcohols and hydroxy-compounds such as butenyl alcohols, hexyl, heptyl, octyl, lauryl alcohol, oleyl alcohol, cresols and the like.

The reaction may be conducted over a wide range of temperatures without affecting the results. Below 60° C., however, the reaction proceeds relatively slowly, and above about 150° C. in the presence of the acidic catalysts side reactions cause a reduction in yield of desired product. The preferred operating range is 60 to 100° C. since the reaction proceeds rapidly, side reactions are at a minimum and good yields of ethers are obtained.

Having thus described my invention, I claim:

1. An ether of dihydroxyoctadecanol corresponding to the formula:

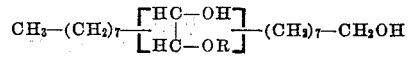

wherein R is a member of the group consisting of alkyl, alkenyl, haloalkenyl and aryl radicals.

2. The compound of claim 1 wherein R is alkyl.

3. The compound of claim 1 wherein R is alkenyl.

4. The compound of claim 1 wherein R is aryl.

5. 9,10(10,9)-Octadecoxyhydroxyoctadecanol.

6. 9,10(10,9)-Alloxyhydroxyoctadecanol.

7. 9,10(10,9)-Phenoxyhydroxyoctadecanol.

8. A process of producing ethers of 9,10-dihydroxyoctadecanol comprising reacting 9,10-epoxyoctadecanol with a hydroxy compound of the formula R—OH, wherein R is a member of the group consisting of alkyl, alkenyl, haloalkenyl and aryl radicals.

9. The process of claim 8 wherein R is octadecyl.

10. The process of claim 8 wherein R is allyl.

11. The process of claim 8 wherein R is phenyl.

12. A process of producing ethers of 9,10-dihydroxyoctadecanol, comprising reacting 9,10-epoxyoctadecanol with a hydroxy compound of the formula R—OH, wherein R is a member of the group consisting of alkyl, alkenyl, haloalkenyl and aryl radicals, in the presence of a reaction catalyst.

13. The process of claim 12 wherein the reaction catalyst is sulfuric acid.

DANIEL SWERN.

REFERENCES CITED

The following references are of record in the file of this patent:

UNITED STATES PATENTS

| Number | Name | Date |
|---|---|---|
| 2,089,569 | Orthuer | Aug. 10, 1937 |
| 2,258,892 | Harris | Oct. 14, 1941 |
| 2,380,185 | Marple et al. | July 10, 1945 |
| 2,411,762 | Swern | Nov. 26, 1946 |